Patented May 8, 1923.

1,454,591

UNITED STATES PATENT OFFICE.

ADRIAAN NAGELVOORT, OF PROVIDENCE, RHODE ISLAND, ASSIGNOR TO THE NITROGEN CORPORATION, OF PROVIDENCE, RHODE ISLAND, A CORPORATION OF RHODE ISLAND.

METHOD OF TREATING GASES.

No Drawing. Application filed March 1, 1921. Serial No. 448,864.

*To all whom it may concern:*

Be it known that I, ADRIAAN NAGELVOORT, a citizen of the United States, residing at Providence, in the county of Providence, and State of Rhode Island, have invented certain new and useful Improvements in Methods of Treating Gases, of which the following is a specification.

This invention relates to an improvement in the process of ammonia synthesis and means for effecting the same, and more particularly to an improved method of purifying the gases employed in the synthesis of ammonia before effecting their combination for the production of ammonia.

One object of the invention is to provide an improved method for treating gases whereby the elemental gases are so treated as to render them capable of reacting effectively in the presence of a suitable catalyst to form ammonia without injury to the catalyst.

Another object of the invention is to provide an improved drying agent capable when properly utilized of effecting complete or approximately complete removal of water vapor from the gases used.

A further object of the invention is to provide an improved method for preparing a drying agent to render the same effective for use for the purpose of drying nitrogen and hydrogen gases for use in the synthesis of ammonia whereby said gases are freed from water vapor without the formation of other deleterious substances.

Other objects and advantages of the invention will be more fully set forth in the detailed description to follow.

Among the various methods proposed for effecting the combination of nitrogen and hydrogen to form synthetic ammonia, are those of passing suitably proportioned quantities of these gases into contact with a catalytic material under such conditions of pressure and temperature as to result in the formation of ammonia. In the commercial use of these methods difficulty has been encountered by reason of the fact that it has been heretofore found impossible to entirely eliminate from the nitrogen and hydrogen gases all traces of water vapor the presence of which, even in minute quantities, tends to reduce the yield of ammonia, and quickly destroy the catalyst, thus making it necessary to interrupt the process at intervals and renew the catalyst. While various methods of treating the gases prior to the synthesis of the same has been proposed none of these methods has proven entirely satisfactory or completely effective to eliminate the water vapor from the gases, either by reason of chemical inability of the drying agent to catch minute traces of moisture or the formation of other deleterious products.

Certain drying agents commonly employed are incapable of being successfully used in removing water vapor from the gases by reason of the fact that they deliquesce upon absorption of water vapor thus losing their effectiveness or unite with the $H_2O$ to form compounds which are not self supporting, that is, break down into a powdery or pasty substance. The powdery substances thus formed are frequently carried along by the flow of gases and clog the conduits, while the pasty substances also prevent free passage of the gases.

I have found that the cyanamids of certain metals such as calcium, barium, sodium, potassium and magnesium may be readily prepared to form efficient drying agents for thoroughly and effectively removing the water vapor from the nitrogen and hydrogen utilized in ammonia synthesis without the formation of products injuriously affecting the catalyst, or the destruction or impairment of the drying agent itself. When properly prepared the cyanamids above mentioned are extremely porous, thus permitting the gases to thoroughly penetrate them, so that all portions of the gases are brought into close contact with the cyanamid compound and the water vapor effectively removed. Moreover, the products formed by reaction of the water vapor upon a cyanamid of this type are in no way detrimental either to the catalyst or to the further progress of the synthesizing process.

As an illustration of the reaction taking place by reason of contact of water vapor in the gases with a cyanamid of the class described, calcium cyanamid may be mentioned as being fairly representative of this class of compounds and being preferable for use by reason of its cheapness. When the water vapor carried by the gases reacts with calcium cyanamid a decomposition is effected, with the consequent formation of ammonia and calcium carbonate, in accordance with the following equation.

(1) $CaCN_2 + 3H_2O = CaCO_3 + 2NH_3$.

The ammonia thus formed will pass over with the dried gases and is added to the ammonia formed during the synthesizing operation, while the calcium carbonate being self supporting serves to maintain the remaining calcium cyanamid in its original form with its porosity unimpaired.

In carrying out my invention I propose to combine hydrogen and nitrogen gases in the proportion of approximately 1 to 3 by volume, the gases being obtained from any desired source as may be found convenient or desirable in practice. The gases above described may be passed through the drying agent separately or after they have been mixed together, except that greater economy of time and labor may be effected by passing the gases through the drier after they have been combined in the proportions indicated above. After being passed through the specially prepared drier the gases are conducted through suitable conduits to the synthesizing chamber, where they are brought into intimate contact with a suitable catalyst under appropriate conditions of pressure and temperature to best activate the given catalyst and insure a maximum yield of ammonia.

As illustrative of the catalysts which may be advantageously employed in carrying out the process in question together with the conditions of temperature and pressure best adapted to be employed in connection with their use reference is made to the following patents granted to John C. Clancy:—1,352,174 patented Sept. 7, 1920; 1,352,177 patented Sept. 7, 1920; 1,352,178 patented Sept. 7, 1920; and 1,363,392 patented Dec. 28, 1920.

While the above patents are mentioned to illustrate certain catalysts which may be advantageously employed it is to be understood that my invention is not limited to use in connection with the catalysts described in the above mentioned patents, but that in carrying out the herein described process I may make use of any suitable catalytic material adapted for use in ammonia synthesis, under appropriate conditions of temperature and pressure.

While, as previously stated, I may use properly prepared cyanamids of either calcium, barium, sodium, potassium, magnesium, as drying agents, I prefer to employ cyanamid of calcium for this purpose, and propose to prepare the same for use after one of the following described methods:—

1st method.—I heat calcium ferro-cyanid for a period of about twenty-four hours at a temperature of from 100° to 200° C., until the ferro-cyanid has been freed from its water of crystallization, and then raise the temperature of the material to approximately 450° or 500° C., for a further period of about twenty-four hours to convert the calcium ferro-cyanid into calcium cyanamid and metallic iron according to the following equation:

(2) $Ca_2Fe(CN)_6 + heat = 2CaCN_2 + Fe + N_2 + 4C$.

While the products of the decomposition may differ slightly under varying conditions in practice, the nitrogen and carbon indicated in the above formula possibly combining to some extent to form cyanogen gas, the main products of the reaction are calcium cyanamid and metallic iron. It will of course be understood that the free nitrogen or cyanogen gas formed as above indicated will pass off as gases while the carbon remaining, if there be any, as well as the metallic iron formed have no injurious effect upon the drying qualities of the product.

2nd method.—I may use commercial calcium cyanamid, which ordinarily contains impurities such as would injuriously affect the catalyst, and treat the same in the following manner to remove the impurities. I heat the commercial calcium cyanamid in an atmosphere of $NH_3$ for a period of approximately twenty-four hours subjecting the same to a temperature of approximately 800° C. The $NH_3$ gas combines with such impurities as phosphorus and sulfur to form ammonium sulfid or ammonium phosphid, which pass off as gases. The product remaining is principally pure calcium cyanamid from which the dangerous impurities have been eliminated as above described.

While for purposes of illustration the above methods of purification have been described in connection with calcium cyanamid, the commercial cyanamids of the other elements mentioned above may be purified and prepared in a similar manner whenever it is found desirable to utilize them, or any of them, in place of the calcium cyanamid.

In carrying out the synthetic process with the aid of cyanamid prepared in the manner previously described, the nitrogen and hydrogen gases are first passed through a quantity of the prepared cyanamid in a suitable receptacle which is connected by conduits with the synthesizing chamber. After passing through the drying agent, where approximately all traces of water vapor are removed from the nitrogen and hydrogen with consequent formation of $NH_3$ as shown in formula (1), the nitrogen, hydrogen and anhydrous ammonia pass through the connecting conduits into the synthesizing chamber where they are brought into intimate contact with the catalyst employed under the desired pressure and at an elevated temperature, the degree of which may be varied depending upon the particular catalyst used.

In using the prepared cyanamid as a drying agent, I may pass the nitrogen and hydrogen gases therethrough under normal atmospheric pressure or under increased pressure, such, for example, as the pressure under which the gases are synthesized, and the drying operation may be effected at ordinary room temperatures or at an elevated temperature. I prefer, however, to use the cyanamid drier under the pressure at which the gases are combined in the ammonia synthesis, and to raise the temperature of the same to approximately 150° C. during the drying operation. The heating of the cyanamid drier as above set forth may be accomplished in any desired manner such as by externally heating the container which holds the cyanamid or by preheating the gases before they traverse the cyanamid.

While any desired catalytic agent may be employed, I suggest for the purpose of illustration the use of a cyanamid or cyanid compound as described in the patents mentioned above, under suitable conditions of temperature and pressure for rendering most effective the particular catalyst employed, which may be stated generally as varying between 25 and 150 atmospheres pressure and 300° to 600° C. temperature.

It will be understood that the anhydrous ammonia present in the mixture of gases as they enter the synthesizing chamber exerts no deleterious effect upon the synthesis but is added to the product of the synthetic operation.

From the synthesizing chamber the gases are conveyed to a suitable point where the ammonia content may be removed in any suitable manner and the mixture of nitrogen and hydrogen remaining uncombined may be returned for further synthesis in the manner described.

What I claim is:—

1. The process of treating gases for use in the synthesis of ammonia which comprises passing the gases to be synthesized into contact with a cyanamid of a base forming element to remove impurities therefrom preparatory to synthesizing ammonia from said gases.

2. The process of treating gases for use in the synthesis of ammonia which comprises passing the gases to be synthesized into contact with a cyanamid of a base forming element under pressure to remove impurities therefrom preparatory to synthesizing ammonia from said gases.

3. The process of treating gases for use in the synthesis of ammonia which comprises passing the gases to be synthesized into contact with a cyanamid of a base element under pressure and at an elevated temperature to remove impurities from said gases preparatory to synthesizing ammonia therefrom.

4. The process of purifying gases for use in the synthesis of ammonia which comprises passing the gases to be synthesized into contact with a cyanamid of a base forming element formed by heating an iron-cyanogen salt of said base forming element to remove impurities from said gases preparatory to synthesizing ammonia from said gases.

5. The process of purifying gases for use in the synthesis of ammonia which comprises passing the gases to be synthesized, while under super-atmospheric pressure, into contact with a purifying agent obtained by heating an iron-cyanogen salt of a base forming element, to remove impurities from said gases preparatory to synthesizing ammonia therefrom.

6. The process of purifying gases for use in the synthesis of ammonia which comprises passing nitrogen and hydrogen gases into contact with a porous cyanamid formed by heating a cyanogen salt of a base forming element, preparatory to synthesizing ammonia from said gases.

7. The process of purifying gases for use in the synthesis of ammonia which comprises passing nitrogen and hydrogen gases into contact with a porous cyanamid formed by heating a cyanogen salt of a base forming element to a temperature of at least 450° C. for a period of approximately twenty-four hours, preparatory to synthesizing ammonia from said gases.

8. The process of purifying gases for use in ammonia synthesis which comprises passing nitrogen and hydrogen gases while under pressure and at an elevated temperature into contact with a porous cyanamid formed by heating an iron-cyanogen salt of a base forming element, preparatory to synthesizing ammonia from said gases.

9. The process of purifying gases for use in ammonia synthesis which comprises passing nitrogen and hydrogen gases into contact with a porous cyanamid formed by heating an iron-cyanogen salt of a base forming element to a temperature of at least 450° C. for a period of approximately twenty-four hours, preparatory to synthesizing ammonia from said gases.

In testimony whereof I have affixed my signature.

ADRIAAN NAGELVOORT.